Nov. 9, 1943.  G. WALTHER ET AL  2,333,753
INDEPENDENTLY ROTATABLE DUAL WHEEL CONSTRUCTION
Filed March 19, 1940
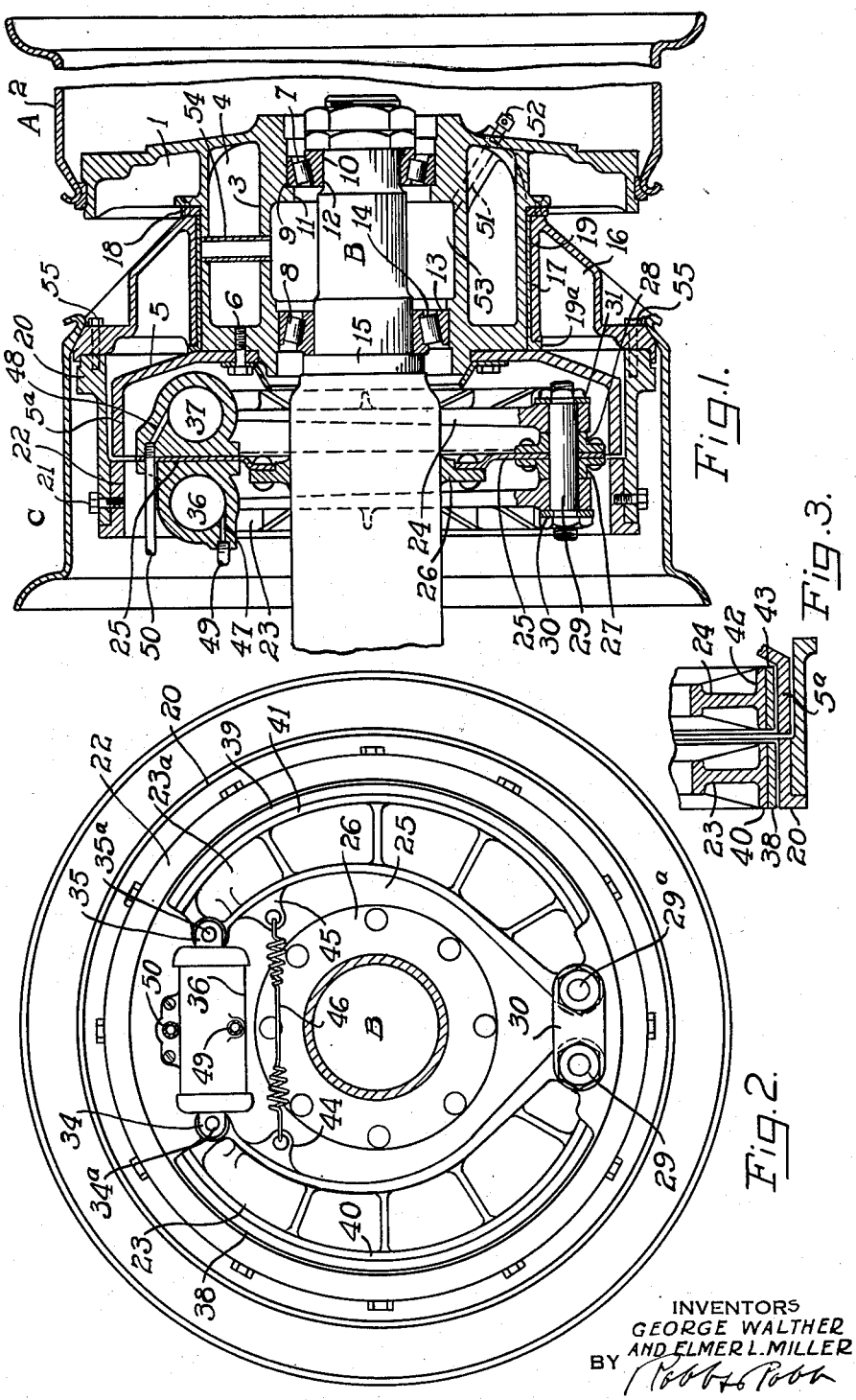
INVENTORS
GEORGE WALTHER
AND ELMER L. MILLER
BY
ATTORNEYS Patented Nov. 9, 1943

2,333,753

UNITED STATES PATENT OFFICE 2,333,753

INDEPENDENTLY ROTATABLE DUAL WHEEL CONSTRUCTION

George Walther and Elmer L. Miller, Dayton, Ohio, assignors to The Dayton Steel Foundry Company, Dayton, Ohio, a corporation of Ohio Application March 19, 1940, Serial No. 324,891

3 Claims. (Cl. 188—18)

The present invention relates to dual wheel construction of the type in which units comprising two independently rotatable wheels are employed at each side of the vehicle upon which they are used. This application is directed to subject matter which was originally presented in the copending sole application of Elmer L. Miller, Serial No. 282,940, filed July 5, 1939, now Patent #2,243,569 issued May 27, 1941, the said Elmer L. Miller being one of the joint applicants hereof.

Dual wheel or double wheel units comprising two wheels interconnected for rotation as a single wheel have been largely employed in connection with heavy duty vehicles such as trucks, motor buses and commercial trailers for some time. The use of such dual wheel units is advantageous from the standpoint of greater supporting surface secured and reduction in the size of individual tires required. Wheel units of this type are subject to the production of a great amount of friction and consequent wear upon the tires because the wheels rotate as one wheel and one or the other of the wheels is dragged over rather than rotates upon the supporting surface during certain conditions of travel. The provision of a dual wheel unit comprising independently rotatable wheels reduces friction; eliminates the dragging of one tire when the vehicle is traveling upon uneven surfaces or is turning; and consequently reduction in fuel consumption and depreciation is effected.

In the construction of wheel units comprising independently rotatable wheels, difficulty has been encountered in the provision of efficient brake applying means for each of the individual wheels of the unit.

Another difficulty is to provide a construction in which adequate supporting bearing surface for each of the wheels may be secured without extending the width dimension of the unit since it is highly desirable to maintain the unit as compact as possible.

The present invention provides a construction of independently rotatable wheel unit which comprises a minimum number of parts, provides adequate rotatable bearing surface for each of the wheels while maintaining compactness of the unit, and provides a very simple and efficient brake drum arrangement in which the brake drums for each wheel of the unit are positioned adjacent one another enabling the brake applying means for both wheels to be compactly located, eliminating duplication of parts and reducing cost of manufacture.

In the dual wheel unit of the present invention, one of the wheels is provided with an extended hub portion which serves as the bearing surface for the other wheel of said unit and around which said other wheel revolves.

In other words, instead of requiring both wheels to be journaled upon the same axle in spaced relation, or requiring the provision of a separate member rotatable about the common axle upon which to journal one of the wheels, and which is connected to the other wheel of the unit, the present invention provides an extended hub portion for one of the wheels which is integral therewith and about which the other wheel is rotatable.

Provision is made for the arrangement of the braking means such that the separate brake drums for each wheel are positioned relatively close together and inside of the inner wheel of the dual wheel unit enabling employment of very compact brake applying means for applying braking action to both drums separately and simultaneously. The novel brake applying means of the invention makes provision for the simultaneous application of separate brake shoes to each of the brake drums of respective wheels of the unit. The use of separate brake shoes for application to each of the separate drums is advantageous because in use the cooperating braking elements for one wheel of a dual wheel unit will not always wear uniformly with the cooperating braking elements of the other wheel of said unit. This is due to the fact that under certain conditions of travel one of the wheels of a unit does not rotate as much as the other wheel of said unit and consequently when the vehicle is braked under such conditions the cooperating braking elements of one of the wheels will not be subjected to the same amount of wear as the corresponding cooperating braking elements of the other wheel of the unit.

Thus for the same reasons that it is desirable in the first instance to provide a dual wheel comprising independently rotatable wheels, namely, the avoidance of undue friction and consequent wear caused thereby, it is likewise desirable to provide independence of action of the respective cooperating braking elements for each wheel of the unit under certain conditions. At the same time, however, it is equally desirable to apply the braking action to both wheels simultaneously. For these reasons the construction of the brake applying means of the present invention provides cooperating brake elements for each wheel of a unit which act independently of, though simultaneously with, the cooperating brake elements of the other wheel of said unit, and the said braking elements of each wheel are automatically equalized to compensate for unequal wear upon the parts thereof.

In the construction of the present invention provision is also made for the lubrication of the relatively movable adjacent bearing surfaces of the respective wheel hubs from a lubricant reservoir located interiorly of one of the said wheel hubs.

The details of the invention will now be more fully described in conjunction with the drawing, in which:

Figure 1 is a vertical sectional view of a wheel unit embodying our invention.

Figure 2 is a plan view of the braking arrangement utilized therein.

Figure 3 is a partial horizontal sectional view through the brake means, showing the relation of the respective brake shoes to their respective inner and outer wheel brake drums.

In the embodiment of the invention shown in the drawing, the dual wheel unit consists of two independently rotatable wheels, one of which is mounted to rotate about the wheel end of the axle of a vehicle to which the unit is applied and comprises a broad hub portion around which the other wheel of the unit rotates.

The letter A designates generally the outer wheel of the unit; B represents the axle of a vehicle not shown; and C represents the inner wheel of the unit which rotates around the hub of the outer wheel.

The outer wheel of the unit comprises a spider 1 to which is detachably secured a tire rim 2, said spider being formed with a horizontally extending hub portion 3 formed integral with said spider and having an annular hollow chamber 4.

To the inner end of the hub portion 3 of the spider 1 is secured a brake drum 5, as by bolts 6. The wheel A is mounted for rotation about the axle B upon spaced sets of roller bearings 7 and 8 supporting the hub 3 rotatably upon the axle B. The bearings 7 are positioned near the wheel end of the hub and operate between cones 9 and 10, the outer cone 9 being tightly seated against the inner wall of the hub and engaging an annular flange 11 thereon for proper positioning of the same axially, and the inner cone 10 being tightly fitted around the axle B.

The other bearings 8 supporting the hub 3 upon the axle B are positioned near the inner end of hub 3 and operate between cones 13 and 14, the outer cone 13 being tightly seated against the inner wall of the hub 3, and the inner cone 14 being tightly fitted around the axle B and engaging an annular shoulder 15 on the axle B for positioning the bearings axially.

The inner wheel C comprises a spider 16 having a wide central bearing portion 17 journaled upon the hub portion 3 of the wheel A for supporting the inner wheel C rotatably upon the said hub portion 3 of the outer wheel A.

A suitable bearing ring 18 is secured to the spider 1 adjacent its hub portion 3 and engages the outer edge of the hub portion 17 of the inner wheel spider 16. A sleeve bearing 19 having a flange 19a is fitted on the hub portion 17 so that the flange 19a is positioned between the inner edge of the hub portion 17 of the inner wheel spider 16 and the brake drum 5. The bearings 18 and 19 serve to properly position the wheel C upon the hub 3 of the outer wheel A.

Secured to the inner wheel spider 16, as by bolts 55, is a brake drum 20, which is of greater diameter than the peripheral brake shoe engaging portion 5a of the outer wheel brake drum 5. Secured to the inner wheel brake drum 20, as by bolts 21, is a peripheral brake shoe engaging liner 22 of the same diameter as the corresponding portion 5a of the brake drum 5 and concentric therewith.

Brake applying means, now to be described, is positioned interiorly of the inner wheel C and comprises a pair of brake shoes 23 and 23a, adapted to engage the liner 22 of the inner wheel brake drum 20, and a pair of brake shoes, only one of which is seen in Figure 1, at 24 adapted to engage the flange 5a of the outer wheel brake drum 5.

Each set of brake shoes is pivotally connected to a brake backing plate 25 so that said sets will be supported at opposite sides of said backing plate. The backing plate 25 is fastened to a collar 26, non-rotatably secured to the axle B. The brake applying means for the inner wheel brake drum is shown more in detail in Figure 2, which is an end view looking toward said brake applying means. The brake applying means for the outer wheel brake drum is substantially identical with that for the inner wheel brake drum.

Fastened to opposite sides of the brake backing plate 25 are bearing members 27 and 28 in which are journaled pivot pins 29 and 29a. Attached to said pivot pins 29 are links 30 and 31. The brake shoes 23 and 23a of the set adapted to engage the inner wheel brake drum 20 are pivotally connected to the pivot pins 29 and 29a respectively at the inboard side of backing plate 25. Likewise, the brake shoes 24 of the set adapted to engage the outer wheel brake drum 5 are pivotally connected to the pivot pins 29 and 29a at the outboard side of said backing plate 25.

The upper ends of the brake shoes 23 and 23a are pivotally connected to the outer ends of piston rods 34 and 35, as at 34a and 35a respectively. The piston rods 34 and 35 are respectively connected to oppositely acting pistons reciprocable in the fluid cylinder 36. Similarly, the upper ends of the brake shoes 24 are pivotally connected to the outer ends of piston rods respectively connected to oppositely acting pistons reciprocable in the fluid cylinder 37. The fluid cylinders 36 and 37 are secured to opposite sides of the brake backing plate 25, as seen in Figure 1. The brake shoes 23 and 23a are provided with brake linings 38 and 39 respectively secured to the flanged portions 40 and 41 respectively of said brake shoes 23 and 23a, and engageable with the liner 22 of the inner wheel brake drum 20. Similarly, the brake shoes 24 are provided with flanged portions 42 to which are secured brake linings 43, engageable with the peripheral portion 5a of the inner wheel brake drum 5.

The brake shoes 23 and 23a are provided with lugs 44 and 45, as are also the brake shoes 24, to which lugs the opposite ends of spring means 46 are connected for normally maintaining the brake shoes retracted from drum-engaging position until expanded thereagainst by operation of the pistons in the cylinders 36 and 37 when the brake means is actuated by the operator of the vehicle.

The fluid pressure cylinders 36 and 37 are of the conventional type, provided with two oppositely acting pistons whose piston rods extend through the opposite ends of the cylinders, as indicated at 34 and 35 in Figure 2. The said fluid pressure cylinders 36 and 37 are provided with inlet ports 47 and 48 respectively to which branches 49 and 50 of the fluid pressure line are respectively connected in the usual manner. The ports 47 and 48 are positioned at the centers of their respective cylinders so as to admit fluid to said cylinders between the inner ends of the oppositely acting pistons operating therein.

In operation, when the brakes are applied by the operator of the vehicle, fluid is admitted to the cylinders 36 and 37 through the branches 49 and 50 of the fluid line, causing the oppositely acting pistons in said cylinders to be moved outwardly away from their normally central positions therein and causing the brake shoes to be expanded in the direction of the brake shoe engaging portions 5a and 22 of the outer wheel brake drum 5 and the inner wheel brake drum 20 respectively. When the brake means is so operated, the brake linings 38 and 39, secured to the brake shoes 23 and 23a, will frictionally engage the peripheral portion 22 of the brake drum 20 to resist rotation of the inner wheel C. And likewise, the brake lining 43 secured to the flanged portions 42 of the brake shoes 24 will frictionally engage the flanged portion 5a of the brake drum 5 to resist rotation of the outer wheel A.

The hub portion 3 of the outer wheel A is provided with a passage 51 leading interiorly thereof and to the outer end of which is connected a lubricant fitting 52. The space 53 between the inner wall of the hub 3 and the axle B comprises a lubricant reservoir which may be supplied with lubricant through the passage 51 to keep the bearings 8 and 9 constantly lubricated.

Extending through the hollow portion 4 of the hub 3 is a grease or oil pipe 54 by which lubricant from the reservoir 53 may be supplied to the adjacent bearing surfaces of the respective outer and inner wheel hubs 3 and 17.

From the above description it will be seen that the invention provides a construction of dual wheel unit in which braking action is applied simultaneously to both inner and outer wheels through the actuation of the brake shoes 23 and 23a acting upon the brake drum for the inner wheel C and the actuation simultaneously therewith of the brake shoes 24 upon the brake drum for the outer wheel A.

It will be readily understood that under various conditions of travel of the vehicle to which dual wheel units of the invention are applied one of the wheels A or C will rotate to a greater extent than the other at a particular time. For example, when the vehicle is making a left turn, the outer wheel A of the dual wheel unit on the left side thereof may remain substantially stationary, or only rotate slightly, while the inner wheel C of said unit A will rotate to a greater degree.

It is clear, therefore, that if the brakes are applied under such conditions there will be produced a substantially greater amount of friction upon the brake shoes 23 and 23a and the brake drum 5 causing greater wear of these parts. This, of course, merely illustrates one condition under which the cooperating braking elements of one wheel may be caused to wear more than the corresponding cooperating braking elements of the other wheel. If the dual wheel unit has been in use for some time, therefore, the brake shoes cooperating with one of the drums will be spaced farther from said drum than will the brake shoes cooperating with the other drum be spaced from said drum. Nevertheless, because of the fluid interconnection between the operating cylinders 36 and 37, the brake action will be automatically equalized when the brakes are applied to compensate for non-uniformity of wear of the respective cooperating braking elements.

Having thus described our invention, what we claim as new and desire to secure by Letters Patent of the United States is:

1. In a device of the class described, in combination, a wheel unit comprising a pair of independently rotatable wheels, a pair of brake drums, one of which is connected with one of said wheels to rotate therewith and the other of which drums is connected with the other of said wheels to rotate therewith, brake means held against rotation and comprising a supporting member, a brake element associated therewith for cooperation with one only of said brake drums, a second brake element associated with said supporting member also and cooperative with the other one of said brake drums, and separate operating units, one of which is associated to actuate one brake element and the other of which is associated to actuate the other brake element as described, the separate brake elements that cooperate with the separate brake drums being attached to the supporting member by pivot means common thereto.

2. In a device of the class described, in combination, a wheel unit comprising a pair of independently rotatable wheels, a brake drum connected with each wheel to rotate therewith, brake means associated with the brake drums and comprising a supporting member disposed within the area surrounded by the brake drums and in a transverse plane intersecting a point about between said drums, sets of brake shoes carried by said supporting member at opposite sides thereof, one set of shoes to cooperate with one of said drums and the other set of shoes to cooperate with the other of said drums, a pivot means carried by the said supporting member and common to the sets of brake shoes for connecting the shoes of each set to each other and connecting the shoes of both sets to the supporting member, and operating means for expanding the brake shoes against the inner portions of the brake drums.

3. In a device of the class described, in combination, a wheel unit comprising a pair of independently rotatable wheels, a pair of brake drums, one of which is connected with one of said wheels to rotate therewith and the other of which drums is connected with the other of said wheels to rotate therewith, brake means held against rotation and comprising a supporting member, a brake element associated therewith for cooperation with one only of said brake drums, a second brake element associated with said supporting member also and cooperative with the other one of said brake drums, and separate operating units, one of which is associated to actuate one brake element and the other of which is associated to actuate the other brake element as described, the operating units comprising separate fluid pressure cylinders, a pair of pistons in each cylinder connected with the ends of the adjacent brake shoe opposite those which are pivotally connected together, and separate fluid supply conduits leading to the two fluid pressure cylinders.

GEORGE WALTHER.
ELMER L. MILLER.